United States Patent
Matsuo

(10) Patent No.: US 9,731,756 B2
(45) Date of Patent: Aug. 15, 2017

(54) DRIVE ASSIST CONTROL APPARATUS

(71) Applicant: JTEKT CORPORATION, Osaka-shi, Osaka (JP)

(72) Inventor: Shigeto Matsuo, Kako-gun (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 15/015,997

(22) Filed: Feb. 4, 2016

(65) Prior Publication Data

US 2016/0244092 A1 Aug. 25, 2016

(30) Foreign Application Priority Data

Feb. 12, 2015 (JP) ................................ 2015-025487

(51) Int. Cl.

| | | |
|---|---|---|
| *B60W 30/12* | (2006.01) | |
| *B62D 6/00* | (2006.01) | |
| *B62D 15/02* | (2006.01) | |
| *B62D 5/04* | (2006.01) | |
| *B62D 6/02* | (2006.01) | |

(52) U.S. Cl.
CPC .......... *B62D 6/002* (2013.01); *B62D 5/0463* (2013.01); *B62D 6/02* (2013.01); *B62D 15/025* (2013.01)

(58) Field of Classification Search
CPC ...... B62D 6/002; B62D 5/0481; B62D 6/008; B62D 1/286; B62D 5/008; B62D 15/025; B60W 30/12; B60W 50/029; B60W 10/184; B60K 23/0808
See application file for complete search history.

(56) References Cited

U.S. PATENT DOCUMENTS

| | | | |
|---|---|---|---|
| 9,327,764 B2 * | 5/2016 | Limpibunterng | .... B62D 15/025 |
| 2002/0007239 A1 * | 1/2002 | Matsumoto | ........ B60K 23/0808 |
| | | | 701/41 |
| 2009/0157263 A1 * | 6/2009 | Shin | ..................... B62D 5/0481 |
| | | | 701/43 |

(Continued)

FOREIGN PATENT DOCUMENTS

| | | |
|---|---|---|
| EP | 1 170 651 A2 | 1/2002 |
| EP | 1 577 194 A1 | 9/2005 |

(Continued)

OTHER PUBLICATIONS

Jul. 12, 2016 Extended Search issued in European Patent Application No. 16155163.5.

*Primary Examiner* — Yuri Kan
(74) *Attorney, Agent, or Firm* — Oliff PLC

(57) ABSTRACT

In a drive assist control apparatus, based on a pinion angle command value and an LKA angle command value, a distribution ratio calculation unit calculates a distribution ratio that is a proportion of the LKA angle command value in a sum of the LKA angle command value and the pinion angle command value. An LA determination unit compares an LA threshold with a lateral acceleration that is related to the LKA angle command value and that is a product of a lateral acceleration and the distribution ratio, and determines whether or not to attenuate the lateral acceleration. When the lateral acceleration is determined to be attenuated, an LKA angle command value correction unit uses a low pass filter to progressively reduce the LKA angle command value to generate a filtered LKA angle command value.

5 Claims, 3 Drawing Sheets

(56) References Cited

U.S. PATENT DOCUMENTS

| | | | | |
|---|---|---|---|---|
| 2011/0264329 A1* | 10/2011 | Limpibunterng | ...... | B62D 5/008 701/41 |
| 2012/0123643 A1* | 5/2012 | Limpibuntering | ..... | B62D 1/286 701/42 |
| 2012/0197496 A1* | 8/2012 | Limpibunterng | ...... | B62D 1/286 701/42 |
| 2013/0103264 A1* | 4/2013 | Takashima | .......... | B60W 10/184 701/42 |
| 2013/0253793 A1* | 9/2013 | Lee | ..................... | B60W 50/029 701/70 |
| 2014/0058628 A1* | 2/2014 | Tamaizumi | ............ | B62D 6/008 701/42 |
| 2015/0298695 A1* | 10/2015 | Kodaira | ................ | B60W 30/12 701/48 |

FOREIGN PATENT DOCUMENTS

| | | |
|---|---|---|
| JP | 2014-040178 A | 3/2014 |
| WO | 2008/023238 A1 | 2/2008 |
| WO | 2011/161535 A1 | 12/2011 |

\* cited by examiner

DRIVE ASSIST CONTROL APPARATUS

INCORPORATION BY REFERENCE

The disclosure of Japanese Patent Application No. 2015-025487 filed on Feb. 12, 2015 including the specification, drawings and abstract, is incorporated herein by reference in its entirety.

BACKGROUND OF THE INVENTION

1. Field of the Invention

The invention relates to a drive assist control apparatus.

2. Description of the Related Art

Electric power steering systems (EPSs) are known in which a torque generated by a motor is applied to a steering mechanism of a vehicle to assist a driver's steering operation. A steering system described in Japanese Patent Application Publication No. 2014-40178 (JP 2014-40178 A) includes a first model that sets a target steering torque based on a steering angle and a second model that sets a target steered angle based on a steering torque. A control apparatus controls the motor based on both models (ideal models).

Recent EPSs are equipped with a system such as an advanced driver assistance system (ADAS) or a lane keeping assist (LKA) that assists the driver's operation. In some of the electric power steering systems, the motor is controlled based on the sum of the amount of control resulting from the driver's steering and the amount of control resulting from a drive assist for the purpose of improving the driver's steering feeling and providing an accurate drive assist.

In the electric power steering apparatuses that control the motor based on the sum of the amount of control resulting from the driver's steering and the amount of control resulting from a drive assist, a lateral acceleration acts on the vehicle due to the driver's steering and the drive assist. The lateral acceleration deteriorates the driver's steering feel. The amount of control performed by the motor may be reduced to decrease the lateral acceleration. However, a simple reduction in the amount of control performed by the motor reduces not only the amount of control resulting from the drive assist but also the amount of control resulting from the driver's steering. Accordingly, the driver's steering operation cannot be sufficiently assisted.

SUMMARY OF THE INVENTION

It is an object of the invention to provide a drive assist control apparatus that enables a more proper reduction in lateral acceleration.

According to an aspect of the invention, a drive assist control apparatus controls steering of a vehicle in accordance with a sum of a first angle command value and a second angle command value, which is a target value for a rotation angle of a rotating shaft of a steering mechanism. The drive assist control apparatus includes: a first calculation unit that calculates the first angle command value for a drive assist, a second calculation unit that calculates the second angle command value based on a steering torque, a distribution ratio calculation unit that calculates a distribution ratio that is a proportion of the first angle command value in the sum of the first angle command value and the second angle command value, a determination unit that multiplies a lateral acceleration of the vehicle by the distribution ratio to determine the lateral acceleration related to the first angle command value and determines whether or not the lateral acceleration related to the first angle command value needs to be reduced, and a correction unit that progressively reduces the first angle command value in accordance with a determination result from the determination unit. The correction unit corrects the first angle command value when the determination result indicates that the lateral acceleration related to the first angle command value needs to be reduced, and does not corrects the first angle command value when the determination result indicates that the lateral acceleration related to the first angle command value need not be reduced.

In this configuration, when the determination unit determines that the lateral acceleration related to the first angle command value needs to be reduced, the correction unit can correct the first angle command value. Thus, the first angle command value can be corrected without a reduction in the second angle command value resulting from the driver's steering. Consequently, the angle command value for the drive assist can be more accurately corrected.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment will be described below in which a drive assist control apparatus is applied to an electric power steering system for a vehicle.

Figure 1:
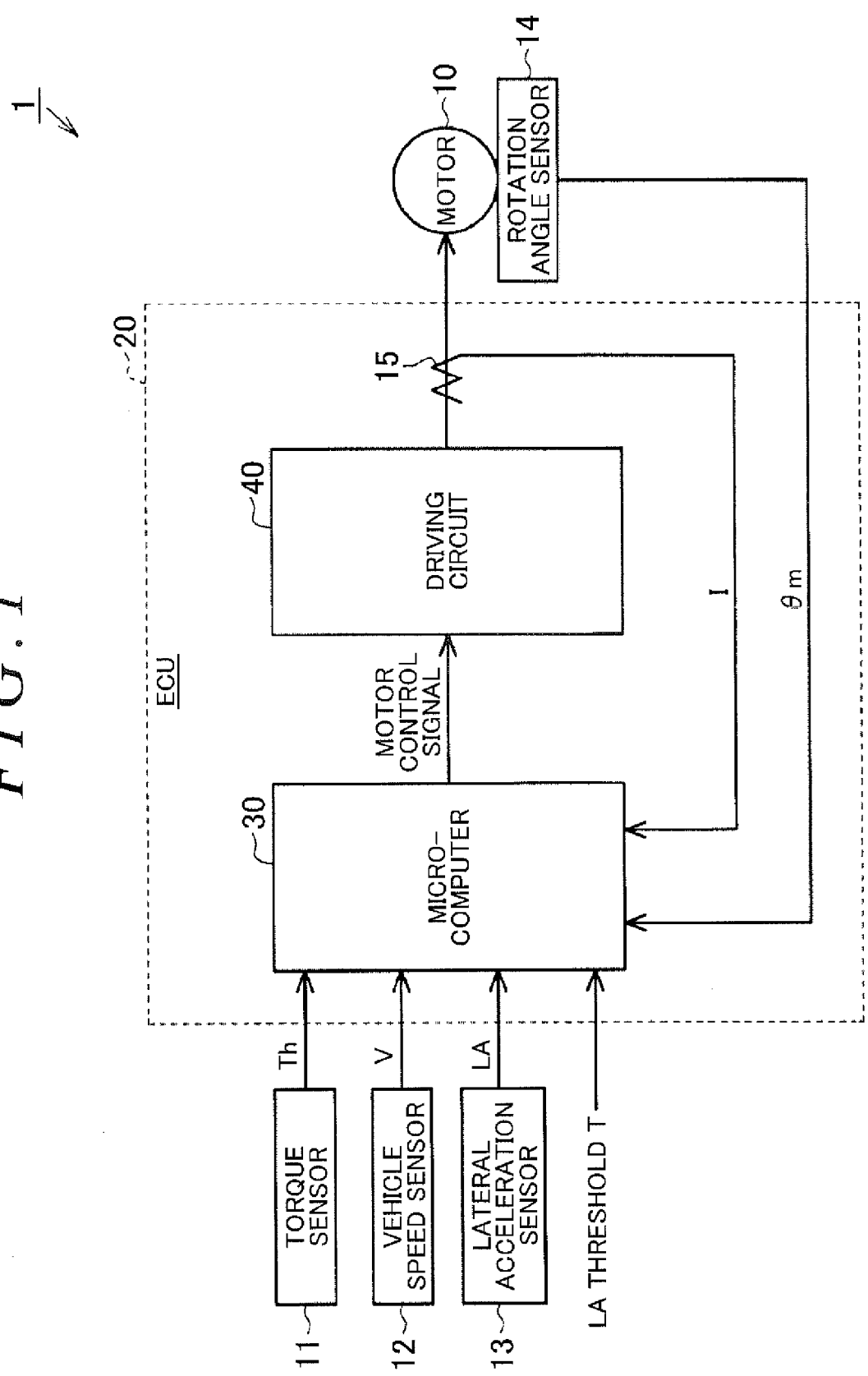
FIG. 1 is a block diagram depicting a general configuration of a control apparatus in an electric power steering system of the present embodiment.

As depicted in FIG. 1, an electric power steering system (EPS) 1 has a motor 10 that applies an assist force to a steering mechanism (not shown) and an ECU 20 that controls the motor 10 based on detection results from various sensors mounted in a vehicle. The various sensors used includes: a torque sensor 11 that detects a steering torque Th applied to the steering mechanism, a vehicle speed sensor 12 that detects a vehicle speed V, a lateral acceleration sensor 13 that detects a lateral acceleration LA acting on the vehicle, a rotation angle sensor 14 that detects a rotation angle $\theta m$ of the motor 10, and a current sensor 15 that detects a value of actual current I supplied to the motor 10. The ECU 20 determines a target assist force to be applied to the steering mechanism based on the state quantities (Th, V, LA, and $\theta m$) of the vehicle detected by the sensors, and supplies the motor 10 with driving electric power used to exert the target assist force.

The ECU 20 includes a microcomputer 30 that generates a motor control signal and a driving circuit 40 that supplies the driving electric power to the motor 10 based on the motor control signal.

Figure 2:
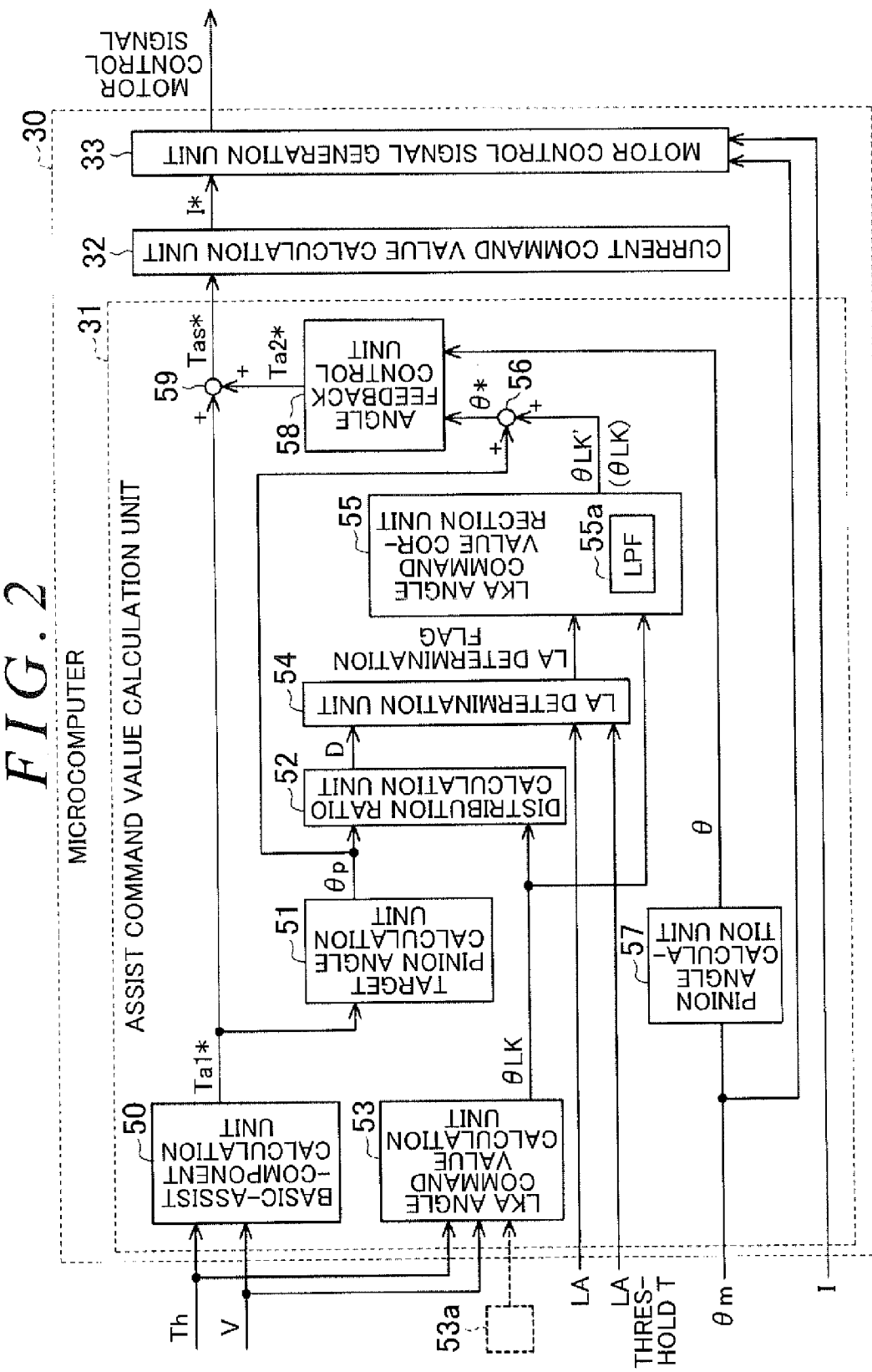
FIG. 2 is a block diagram depicting a general configuration of a microcomputer in the electric power steering system of the present embodiment.

As depicted in FIG. 2, the microcomputer 30 has an assist command value calculation unit 31, a current command value calculation unit 32, and a motor control signal generation unit 33.

The assist command value calculation unit 31 calculates an assist command value Ta* based on the steering torque Th, the vehicle speed V, and the lateral acceleration LA that are acquired through the torque sensor 11, the vehicle speed sensor 12, and the lateral acceleration sensor 13.

The current command value calculation unit 32 calculates a current command value I* based on the assist command value Ta*.

The motor control signal generation unit 33 retrieves the current command value I*, the value of actual current I, and the rotation angle θm of the motor 10. The motor control signal generation unit 33 uses the rotation angle θm of the motor 10 to convert a phase for the value of actual current I, and performs feedback control according to a deviation between the current command value I* and the value of actual current I to generate a motor control signal.

Now, a configuration of the assist command value calculation unit 31 will be described in detail. As depicted in FIG. 2, the assist command value calculation unit 31 has a basic-assist-component calculation unit 50, a target pinion angle calculation unit 51, a distribution ratio calculation unit 52, an LKA angle command value calculation unit 53, an LA determination unit 54, an LKA angle command value correction unit 55, an adder 56, a pinion angle calculation unit 57, an angle feedback control unit 58, and an adder 59.

The basic-assist-component calculation unit 50 calculates a basic assist component Ta1* that is a basic component of the assist command value Ta* based on the steering torque Th and the vehicle speed V. The basic-assist-component calculation unit 50 sets the absolute value of the basic assist component Ta1* such that the absolute value increases as the absolute value of the steering torque Th increases and the vehicle speed V decreases.

The target pinion angle calculation unit 51 uses the basic assist component Ta1* calculated by the basic-assist-component calculation unit 50 and the steering torque Th detected by the torque sensor 11 to calculate a pinion angle command value θp corresponding to the driver's steering based on an ideal model. The pinion angle command value θp is a target value for a pinion angle θ that is a rotation angle of a pinion shaft (not shown) of a rack-and-pinion mechanism that steers the steered wheels in accordance with the steering. The pinion angle θ is obtained from the rotation angle θm of the motor 10 or the like. The ideal model is a model of an ideal pinion angle command value θp that the vehicle should have in association with the basic assist component Ta1* and the steering torque Th, and the ideal model is obtained through experiment or the like in advance.

The LKA angle command value calculation unit 53 performs lane keeping assist (LKA) control as an example of drive assist control. The LKA angle command value calculation unit 53 calculates an LKA angle command value θLK based on the steering torque Th and the vehicle speed V. In the LKA control, the motor 10 is controlled such that the vehicle travels along a white line on a road recognized by an external detector 53a such as a camera.

Based on the pinion angle command value θp calculated by the target pinion angle calculation unit 51 and the LKA angle command value θLK calculated by the LKA angle command value calculation unit 53, the distribution ratio calculation unit 52 calculates a distribution ratio D using the following expression.

$$\text{Distribution ratio } D = |\text{LKA angle command value } \theta LK| / (|\text{LKA angle command value } \theta LK| + |\text{pinion angle command value } \theta p|) \quad (1)$$

The distribution ratio D indicates the proportion of the LKA angle command value θLK in the sum of the LKA angle command value θLK and the pinion angle command value θp. On the right side of Expression (1), absolute values are used for a denominator and a numerator. This is to prevent the distribution ratio D from being overestimated. That is, when the LKA angle command value θLK and the pinion angle command value θp have opposite signs, the LKA angle command value θLK and the pinion angle command value θp negate each other in the denominator of Expression (1). Thus, the absolute value of the denominator in Expression (1) is small. As the denominator in Expression (1) is near zero, the distribution ratio D is excessively higher than the proper value. Thus, the distribution ratio D can be more accurately calculated by determining the distribution ratio D after executing processing obtaining absolute values of the LKA angle command value θLK and the pinion angle command value θp.

The LA determination unit 54 generates an LA determination flag based on the distribution ratio D, the lateral acceleration LA, and a lateral acceleration threshold (LA threshold) T that have been received. That is, the LA determination unit 54 compares a lateral acceleration LA' related to the LKA angle command value θLK calculated based on Expression (2) with the LA threshold T stored in a memory (not shown) or the like to generate the LA determination flag. The lateral acceleration LA' is a lateral acceleration resulting from LKA control performed on the lateral acceleration LA. The LA threshold T is a value set based on mapping or an empirical rule and is set to such a limit value for the lateral acceleration LA that does not cause discomfort to the driver.

$$\text{Lateral acceleration } LA' = \text{lateral acceleration } LA \times \text{distribution ratio } D \quad (2)$$

Since the level of the driver's discomfort is likely to increase as the lateral acceleration LA increases, the lateral acceleration LA is preferably reduced. However, a simple reduction in lateral acceleration LA reduces not only the lateral acceleration LA' resulting from the LKA control but also a lateral acceleration resulting from the driver's steering. That is, since the lateral acceleration is attenuated by attenuating the pinion angle command value θp resulting from the driver's steering, the driver's desired assist force may not be exerted. Thus, instead of simply attenuating the lateral acceleration LA, it is preferable to attenuate the lateral acceleration LA' resulting from the LKA control without attenuating the lateral acceleration resulting from the driver's steering. That is, the LKA angle command value θLK resulting from the LKA control is attenuated without attenuating the pinion angle command value θp resulting from the driver's steering.

Thus, in the present embodiment, the LKA angle command value θLK is corrected by comparing the lateral acceleration LA' calculated in accordance with Expression (2) with the LA threshold T. That is, when the lateral acceleration LA' is higher than the LA threshold T, the LA determination unit 54 generates an LA determination flag indicating that the lateral acceleration LA' is to be attenuated. In contrast, when the lateral acceleration LA' is equal to or lower than the LA threshold T, the LA determination unit 54 generates an LA determination flag indicating that the lateral acceleration LA' is not to be attenuated.

The LKA angle command value correction unit 55 corrects the LKA angle command value θLK in accordance with the LA determination flag. Specifically, the LKA angle command value correction unit 55 includes a low pass filter

55a that progressively reduces the LKA angle command value θLK. When the LA determination flag indicates that the lateral acceleration LA' is to be attenuated, the LKA angle command value correction unit 55 progressively reduces the LKA angle command value θLK by use of the low pass filter 55a to generate a filtered LKA angle command value θLK'. In contrast, when the LA determination flag indicates that the lateral acceleration LA' is not to be attenuated, the LKA angle command value correction unit 55 does not correct the LKA angle command value θLK. In other words, attenuation of the LKA angle command value θLK by use of the low pass filter 55a is not performed.

The adder 56 calculates the sum of the pinion angle command value θp calculated by the target pinion angle calculation unit 51 and the filtered LKA angle command value θLK' or the LKA angle command value θLK calculated by the LKA angle command value correction unit 55 to determine an angle command value θ*.

The pinion angle calculation unit 57 calculates the pinion angle θ based on the rotation angle θm of the motor 10.

The angle feedback control unit 58 performs feedback control based on the deviation of the pinion angle θ from the angle command value θ* in order to match the pinion angle θ with the angle command value θ*, and calculates a correcting assist component Ta2*.

The adder 59 calculates the assist command value Ta* by adding the correcting assist component Ta2* to the basic assist component Ta1*.

Now, a procedure of correction processing for the LKA angle command value θLK executed by the assist command value calculation unit 31 will be described using a flowchart.

Figure 3:
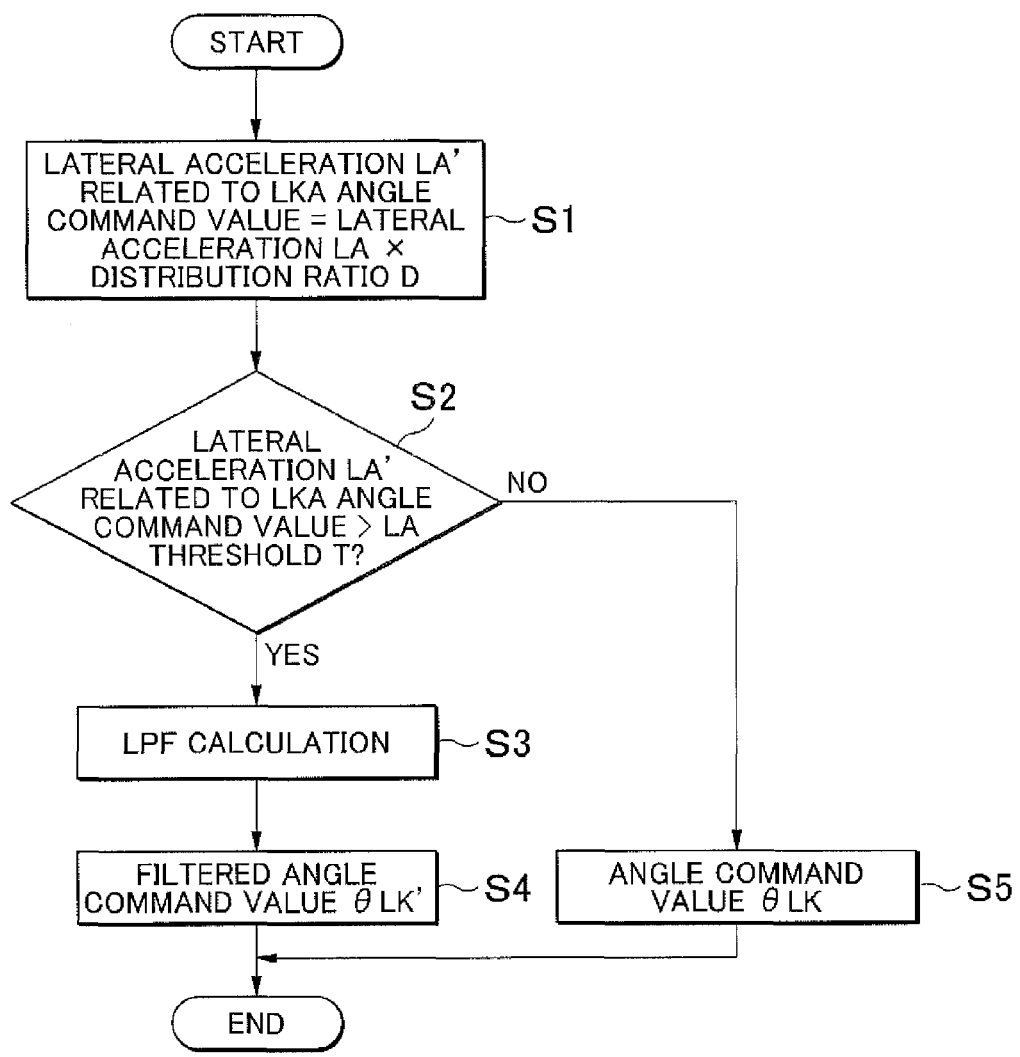
FIG. 3 is a flowchart illustrating a procedure for correcting an LKA angle command value in the electric power steering system of the present embodiment.

As depicted in FIG. 3, first, the lateral acceleration LA' related to the LKA angle command value θLK is calculated (step S1).

Next, the assist command value calculation unit 31 determines whether or not the lateral acceleration LA' related to the LKA angle command value θLK is higher than the LA threshold T (step S2).

When the lateral acceleration LA' related to the LKA angle command value θLK is higher than the LA threshold T (YES in step S2), low pass filter (LPF) processing of progressively reducing the LKA angle command value θLK by use of the low pass filter 55a is executed (step S3) to generate the filtered LKA angle command value θLK' (step S4). The correction processing is then ended.

When the lateral acceleration LA' related to the LKA angle command value θLK is equal to or lower than the LA threshold T (NO in step S2), the LKA angle command value θLK is not corrected but is directly adopted (step S5). The correction processing is then ended.

The above flow of the procedure allows attenuation of a component of the lateral acceleration LA that is related to the LKA angle command value θLK resulting from the LKA control without attenuating a component of the lateral acceleration LA that is related to the pinion angle command value θp resulting from the driver's steering. Thus, the lateral acceleration LA' can be more accurately attenuated.

Effects of the present embodiment will be described.

(1) Attenuating the LKA angle command value θLK allows the lateral acceleration LA' resulting from the LKA control to be more properly attenuated. That is, when the lateral acceleration LA' related to the LKA angle command value θLK is higher than the LA threshold T, the LKA angle command value θLK is filtered by the low pass filter 55a and is thus attenuated. Therefore, the LKA angle command value θLK resulting from the LKA control can be attenuated without attenuating the pinion angle command value θp resulting from the driver's steering. In other words, attenuating the lateral acceleration LA' allows the lateral acceleration LA to be attenuated with the driver's desired assist force ensured.

(2) Whether or not to correct the lateral acceleration LA by attenuating the LKA angle command value θLK can be determined simply by using the distribution ratio D between the pinion angle command value θp resulting from the driver's steering and the LKA angle command value θLK resulting from the LKA control to determine whether or not the lateral acceleration LA' is higher than the LA threshold T. That is, whether or not to attenuate the LKA angle command value θLK can be determined by simple determination of whether or not the lateral acceleration LA' is higher than the LA threshold T.

(3) A more accurate distribution ratio D can be determined by executing the processing of obtaining absolute values of the LKA angle command value θLK and the pinion angle command value θp into the respective absolute values before determining the distribution ratio D. In the case where the absolute-value processing is not executed, when the LKA angle command value θLK and the pinion angle command value θp have opposite signs, the distribution ratio D may be overestimated because the denominator of the distribution ratio D is underestimated. In the present embodiment, a more accurate distribution ratio D can be determined by executing the absolute-value processing on the LKA angle command value θLK and the pinion angle command value θp before determining the distribution ratio D.

The present embodiment may be modified as follows.

In the present embodiment, the LKA angle command value correction unit 55 uses the determination flag to determine whether or not the LKA angle command value θLK should be filtered by the low pass filter 55a. However, the invention is not limited to this. For example, the following configuration is possible: when the LA determination flag indicating that the lateral acceleration LA' is not to be attenuated is input, power supply to the LKA angle command value correction unit 55 may be stopped, and the LKA angle command value calculation unit 53 may output the LKA angle command value θLK to the adder 56. The adder 56 then adds the pinion angle command value θp and the LKA angle command value θLK together to obtain the angle command value θ*. The angle feedback control unit 58 then uses the angle command value θ* to perform feedback control in order to match the pinion angle θ with the angle command value θ*.

In the present embodiment, a method for determining the distribution ratio D is not limited to Expression (1). For example, the LKA angle command value θLK and the pinion angle command value θp may be weighted based on, for example, an empirical rule.

In the present embodiment, the processing of obtaining absolute values of the LKA angle command value θLK and the pinion angle command value θp is executed before the distribution ratio D is determined. However, the absolute-value processing need not be executed. In this case, the distribution ratio D is overestimated when the LKA angle command value θLK and the pinion angle command value θp have opposite signs, but an accurate distribution ratio D can be determined when the LKA angle command value θLK and the pinion angle command value θp have the same sign.

In the present embodiment, although the LA threshold T is constant, the LA threshold T may vary according to the vehicle speed V. That is, the lateral acceleration LA that cause discomfort to the driver varies according to the vehicle speed V. Alternatively, calculation processing may be executed in which the LKA angle command value θLK is progressively reduced according to the lateral acceleration LA without the use of the LA threshold T.

In the present embodiment, although the LKA angle command value correction unit 55 is provided with one low pass filter 55a, a plurality of filters may be provided in the LKA angle command value correction unit 55. For example, any of these filters may be selected according to the lateral acceleration LA.

In the present embodiment, the pinion angle θ is used. However, the invention is not limited to this. For example, a steering angle may be used.

In the present embodiment, the lane keeping assist control is used as an example of drive assist control. However, the invention is not limited to this. For example, advanced driver assistance system (ADAS) such as parking assist or lane change assist may be used.

In the present embodiment, the LKA angle command value calculation unit 53 is provided in the ECU 20 that controls the EPS1. However, the LKA angle command value calculation unit 53 may be provided in an ECU for the vehicle body.

In the present embodiment, the electric power steering system and the drive assist control apparatus are combined together. However, the invention is not limited to this. For example, a steer-by-wire system and the drive assist control apparatus may be combined together.

The drive assist control apparatus of the present embodiment may be embodied in any electric power steering systems. For example, the drive assist control apparatus of the present embodiment may be embodied in a columnar electric power steering system or a rack-parallel electric power steering system.

What is claimed is:

1. A drive assist control apparatus that controls steering of a vehicle in accordance with a sum of a first angle command value and a second angle command value, which is a target value for a rotation angle of a rotating shaft of a steering mechanism, the drive assist control apparatus comprising:
   a first calculation unit that calculates the first angle command value for a drive assist;
   a second calculation unit that calculates the second angle command value based on a steering torque;
   a distribution ratio calculation unit that calculates a distribution ratio that is a proportion of the first angle command value in the sum of the first angle command value and the second angle command value;
   a determination unit that multiplies a lateral acceleration of the vehicle by the distribution ratio to determine the lateral acceleration related to the first angle command value and determines whether or not the lateral acceleration related to the first angle command value needs to be reduced; and
   a correction unit that progressively reduces the first angle command value in accordance with a determination result from the determination unit; wherein
   the correction unit corrects the first angle command value when the determination result indicates that the lateral acceleration related to the first angle command value needs to be reduced, and does not corrects the first angle command value when the determination result indicates that the lateral acceleration related to the first angle command value need not be reduced.

2. The drive assist control apparatus according to claim 1, wherein
   the determination unit determines that the first angle command value needs to be reduced when the lateral acceleration related to the first angle command value is higher than a predetermined threshold, and
   determines that the first angle command value need not be reduced when the lateral acceleration related to the first angle command value is equal to or lower than the predetermined threshold.

3. The drive assist control apparatus according to claim 1, wherein
   the correction unit has a low pass filter that progressively reduces the first angle command value.

4. The drive assist control apparatus according to claim 1, wherein
   the distribution ratio calculation unit calculates the distribution ratio using absolute values of the first angle command value and the second angle command value.

5. The drive assist control apparatus according to claim 1, wherein
   the drive assist is a lane keeping assist in which traveling of the vehicle is assisted based on information of a white line on a road recognized by an external detector, and
   the first calculation unit calculates the first angle command value based on the information of the white line and a steering direction.

* * * * *